United States Patent
Delorenzis

(10) Patent No.: US 8,616,565 B1
(45) Date of Patent: Dec. 31, 2013

(54) SELF-STEER LIFT AXLE SUSPENSION SYSTEM HAVING A STEERING RETURN, DAMPER AND LOCK INTEGRATED WITH A STEERING KNUCKLE ASSEMBLY

(75) Inventor: Damon Delorenzis, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 0 days.

(21) Appl. No.: 13/605,938

(22) Filed: Sep. 6, 2012

(51) Int. Cl.
*B62D 7/18* (2006.01)
*B62D 7/22* (2006.01)
*B62D 61/12* (2006.01)
*B62D 13/04* (2006.01)
*B62D 13/06* (2006.01)

(52) U.S. Cl.
USPC ............. 280/89.11; 280/89.12; 280/86.5; 280/93.512

(58) Field of Classification Search
USPC ............ 280/89, 89.1, 89.11, 89.12, 90, 86.5, 280/93.512, 81.6, 426
See application file for complete search history.

(56) References Cited

U.S. PATENT DOCUMENTS

| | | | |
|---|---|---|---|
| 4,441,730 A | 4/1984 | Damm | |
| 4,770,430 A | 9/1988 | Lange | |
| 4,786,114 A | 11/1988 | Steiner et al. | |
| 4,828,229 A * | 5/1989 | Fannin et al. | 267/64.25 |
| 4,881,747 A | 11/1989 | Raidel | |
| 4,893,825 A | 1/1990 | Janson | |
| 4,903,976 A | 2/1990 | Baillie | |
| 5,018,756 A | 5/1991 | Mitchell | |
| 5,244,226 A | 9/1993 | Bergh | |
| 5,620,194 A | 4/1997 | Keeler et al. | |
| 6,007,078 A | 12/1999 | Gottschalk et al. | |
| 6,398,239 B1 | 6/2002 | Chalin | |
| 6,616,156 B1 | 9/2003 | Dudding et al. | |
| 7,131,652 B2 | 11/2006 | Ramsey | |
| 7,748,724 B2 | 7/2010 | Gottschalk | |

OTHER PUBLICATIONS

Specification and drawings for U.S. Appl. No. 13/095,588, 30 pages.
Hendrickson Parts List Airtek / Steertek for Freightliner, Literature No. SP-169 Revision D dated Mar. 2012, www.hendrickson-intl.com, 18 pages.
BPW Original Spare Parts Steering Axles Series SKW.., SH.., S..LL Brochure BPW-EL-B 3108801e, downloaded Jul. 12, 2012, 1 page.

* cited by examiner

*Primary Examiner* — Keith Frisby
(74) *Attorney, Agent, or Firm* — Smith IP Services, P.C.

(57) ABSTRACT

A vehicle suspension system can include a steering knuckle assembly with a steer return device, and a biasing device comprising an elastomeric toroid which is deformed by the steer return device. Another suspension system can include a king pin having opposite ends, and a steering knuckle assembly including a steer return device, a steer lock, and a biasing device which is deformed by the steer return device. The steer return device, steer lock and biasing device can be positioned at a same opposite end of the king pin. Another suspension system can include a king pin, and a steering knuckle assembly including a steer return device which encircles the king pin. The steering knuckle assembly can be rotated relative to the king pin, without axial displacement relative to the king pin, by a biasing force which results from deformation of a biasing device by the steer return device.

42 Claims, 16 Drawing Sheets

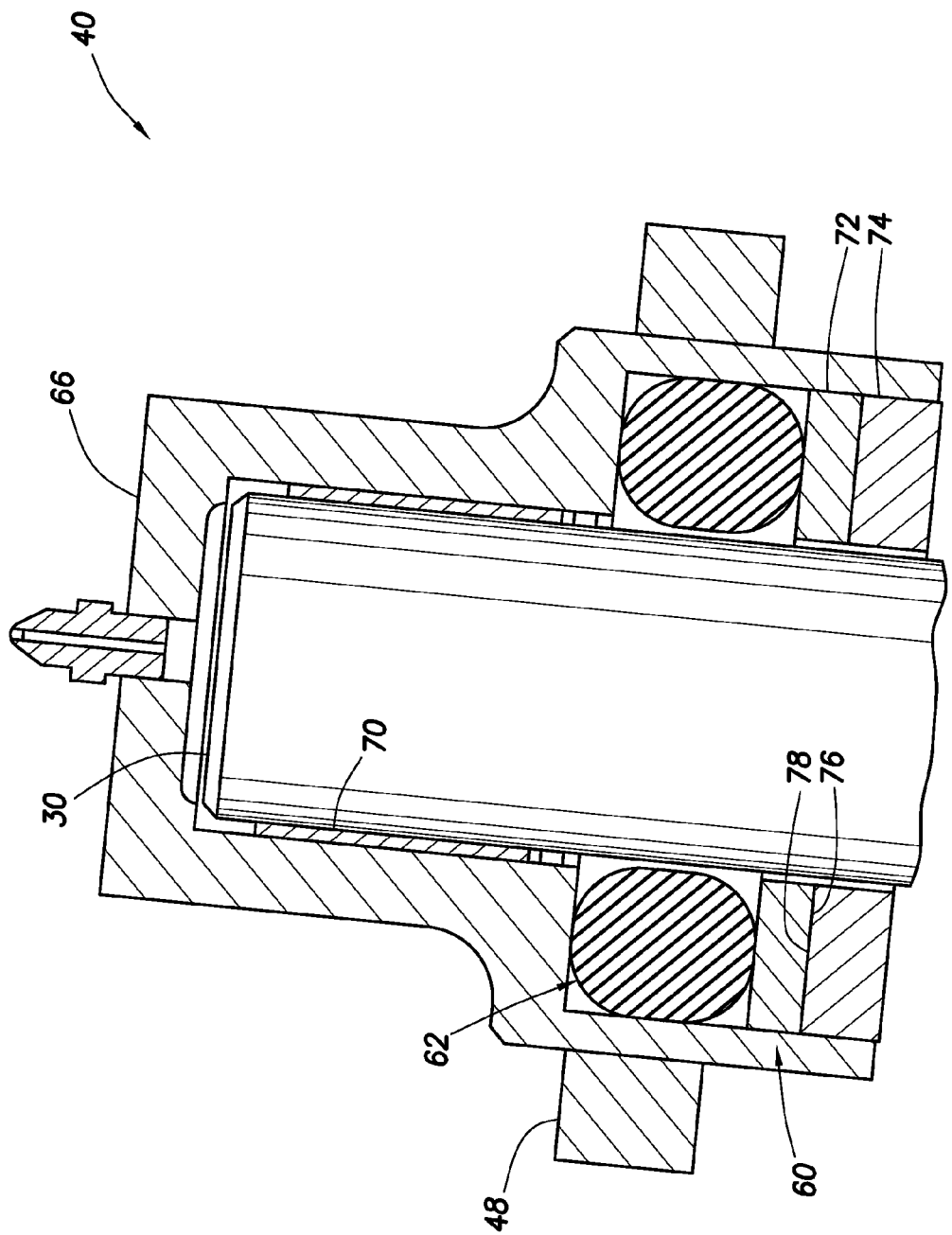

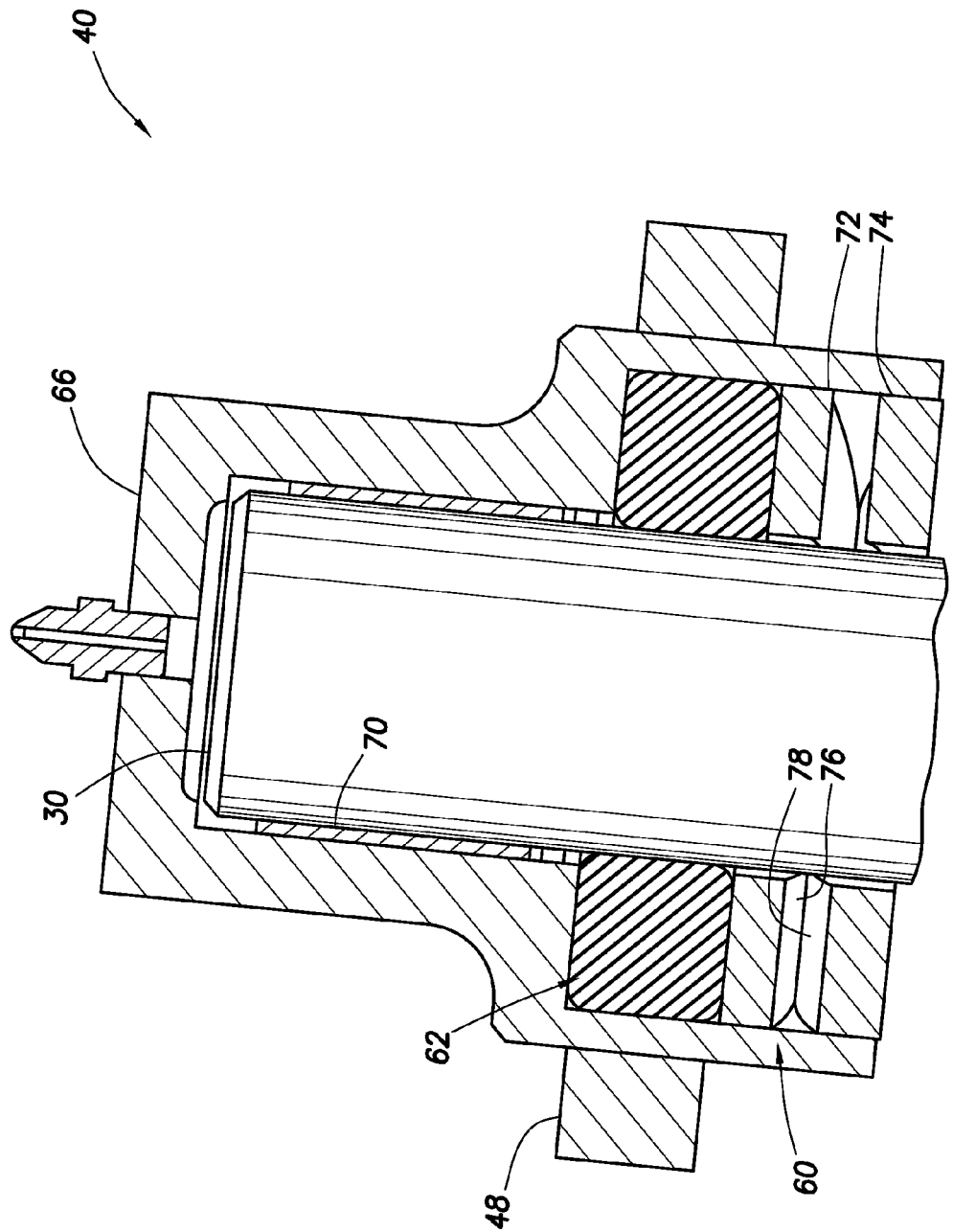

SELF-STEER LIFT AXLE SUSPENSION SYSTEM HAVING A STEERING RETURN, DAMPER AND LOCK INTEGRATED WITH A STEERING KNUCKLE ASSEMBLY

BACKGROUND

This disclosure relates generally to vehicle suspension systems and, in an example described below, more particularly provides a self-steer lift axle suspension system having a steering return, damper and lock integrated with a steering knuckle assembly.

Conventional steering return, damper and lock mechanisms for lift axle suspension systems tend to be heavy, bulky and labor intensive to manufacture, install and maintain. It will be appreciated by those skilled in the art that reductions in suspension system weight and manufacturing costs are continually needed, without reductions in quality or performance.

SUMMARY

A vehicle suspension system is provided to the art by this disclosure. In one example described below, the suspension system can include a steering knuckle assembly with a steer return device, and a biasing device which is deformed by the steer return device. The biasing device can include an elastomeric toroid.

Another vehicle suspension system example can include a king pin having opposite ends, and a steering knuckle assembly including a steer return device, a steer lock, and a biasing device which is deformed by the steer return device. The steer return device, steer lock and biasing device can be positioned at a same opposite end of the king pin.

Yet another vehicle suspension system example can include a king pin, and a steering knuckle assembly including a steer return device which encircles the king pin. The steering knuckle assembly can be rotated relative to the king pin, without axial displacement relative to the king pin, by a biasing force which results from deformation of a biasing device by the steer return device.

A vehicle suspension system described below can include a king pin, and a steering knuckle assembly including a steer lock which selectively permits and prevents rotation of the steering knuckle assembly relative to the king pin. The steer lock may include a cam which extends about an axis of the king pin.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIGS. 10A-12B are representative cross-sectional views of further examples of the steering knuckle assembly in centered and steered configurations.

DETAILED DESCRIPTION

Figure 1:
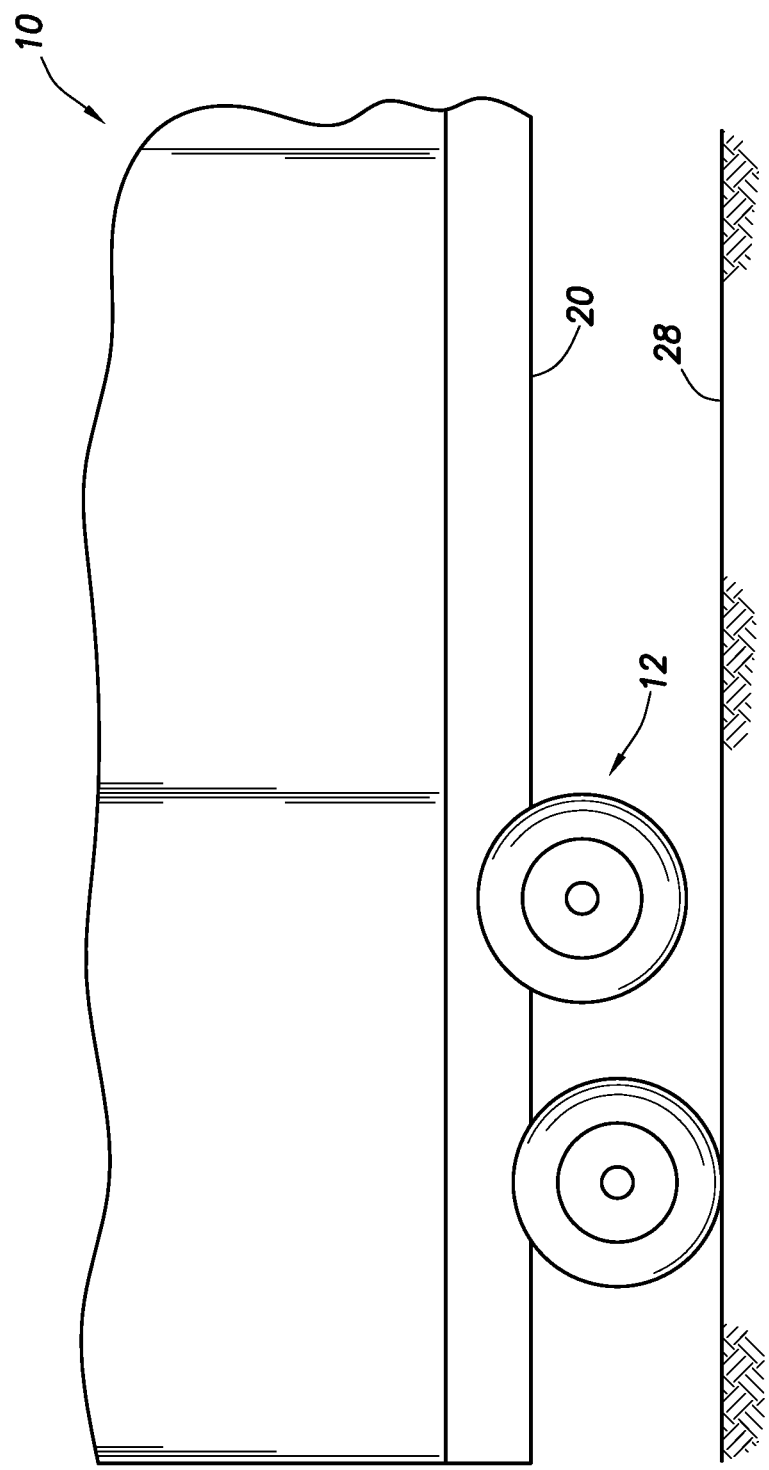
FIG. 1 is a representative elevational view of a vehicle which can embody principles of this disclosure.

Representatively illustrated in FIG. 1 is a vehicle 10 which can benefit from the principles of this disclosure. However, it should be clearly understood that the vehicle 10 is merely one example of an application of the principles of this disclosure in practice, and a wide variety of other examples are possible. Therefore, the scope of this disclosure is not limited at all to the details of the vehicle 10 herein and/or depicted in the drawings.

In the FIG. 1 example, the vehicle 10 comprises a truck, tractor or trailer having a lift axle suspension system 12. The suspension system 12 is liftable relative to a frame 20, so that tires of the suspension system are out of contact with a road surface 28.

Figure 2:
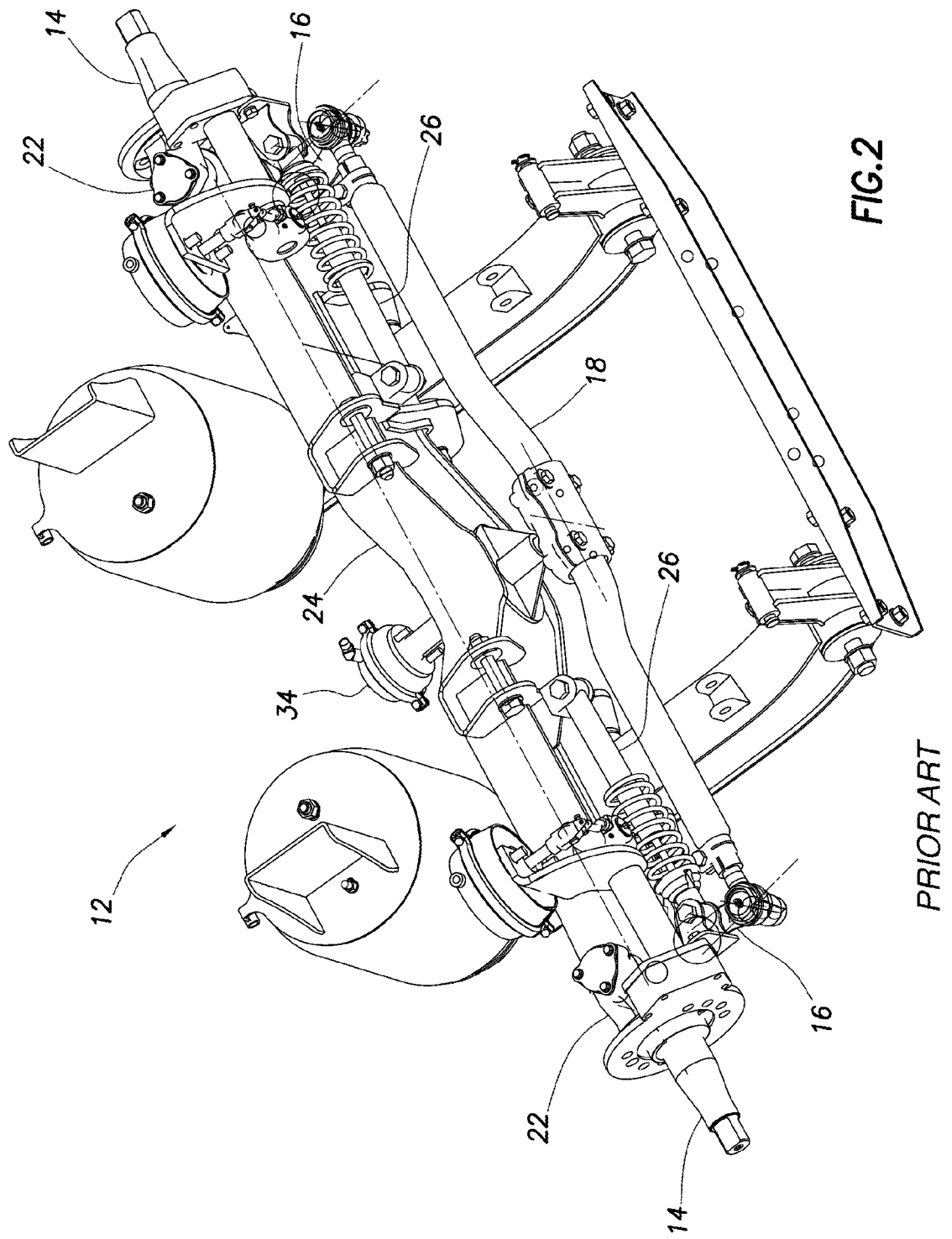
FIG. 2 is a perspective view of a suspension system which can benefit from the principles of this disclosure.
Figure 2A:
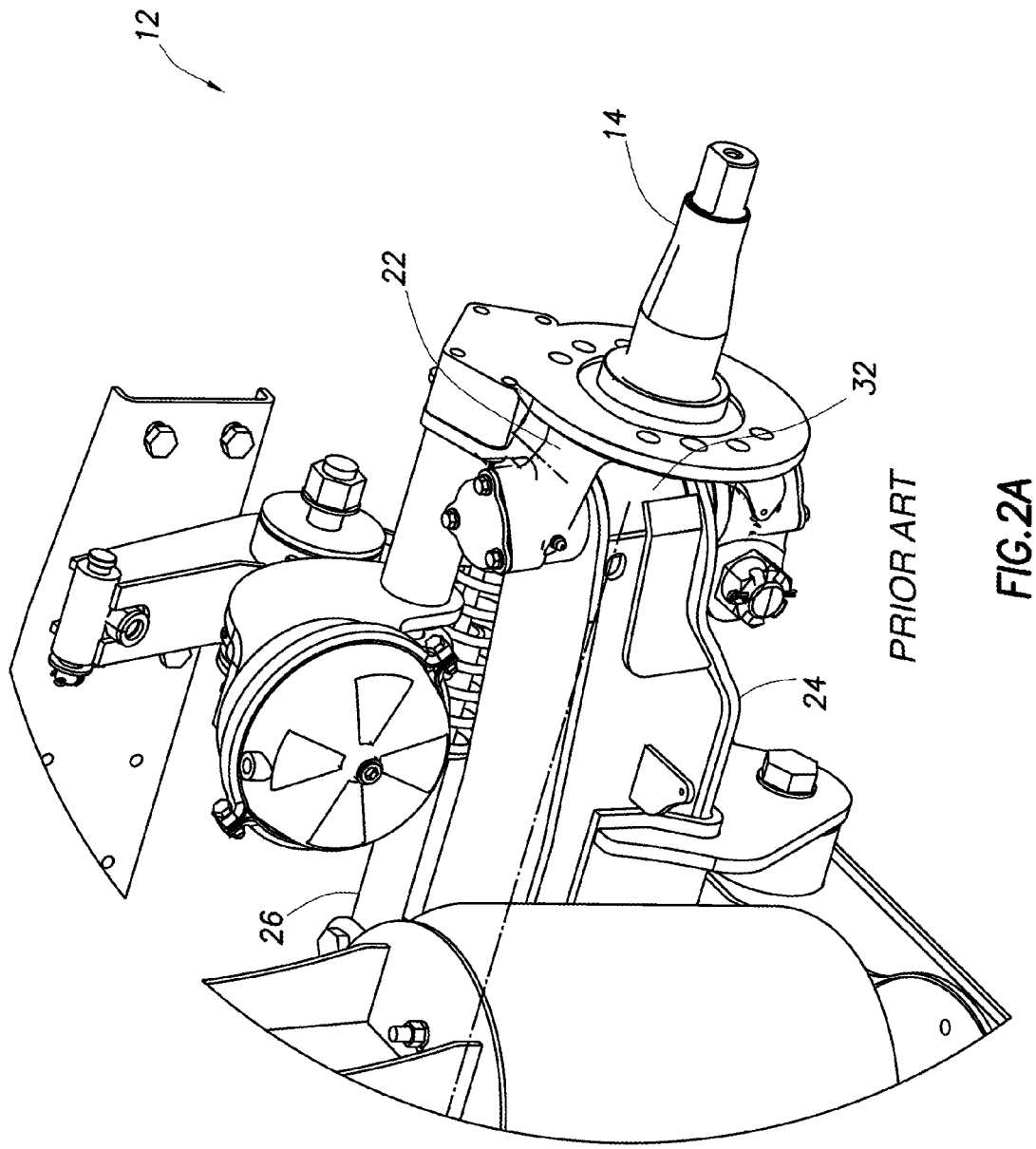
FIG. 2A is a perspective view of a portion of the suspension system.

Referring additionally now to FIGS. 2 & 2A, the suspension system 12 is depicted, apart from the vehicle 10. The suspension system 12 illustrated in FIGS. 2 & 2A is of the type typically referred to as a trailing arm suspension system, but the scope of this disclosure is not limited to any particular type of suspension system.

In the suspension system 12, spindles 14 are provided at opposite lateral ends for rotatably mounting hubs, wheels and tires (not shown in FIGS. 2 & 2A). The spindles 14 are mounted on steering knuckle assemblies 22, which rotate relative to respective king pins 30 (not visible in FIGS. 2 & 2A, see FIG. 3) contained in king pin housings 32 at opposite ends of an axle 24.

Tie rod arms 16 extend outwardly from the steering knuckle assemblies 22. The tie rod arms 16 are pivotably connected to a tie rod 18, thereby ensuring that the steering knuckle assemblies 22 rotate together.

In this example, actuators 26 (similar to coil-over shock absorbers) are used to "center" the steering knuckle assemblies 22 when desired (for example, to prevent steering when the vehicle 10 is backing up, during relatively high speed driving, etc.). The term "center" is used here to indicate a middle position of the tie rod 18 and steering knuckle assemblies 22, it being understood that there may be some "toe in" or other deviation which results in the spindles 14 not being precisely laterally aligned when the tie rod 18 and steering knuckle assemblies 22 are "centered."

In the suspension system 12, the actuators 26 dampen rotation of the steering knuckle assemblies 22 and bias the tie rod 18 to its center position. However, it would be even more beneficial if the actuators 26 (and associated brackets, fasteners, etc.) could be eliminated, thereby reducing the weight of the suspension system 12, and eliminating the actuator inventory and the labor required to install and maintain the actuators.

The suspension system 12 also includes a steer lock 34 with its associated pneumatic actuator, brackets, push rod and receiver on the tie rod 18. It would be beneficial if the weight of, and the labor required to install and maintain, the steer lock 34 could be eliminated.

Figure 3:
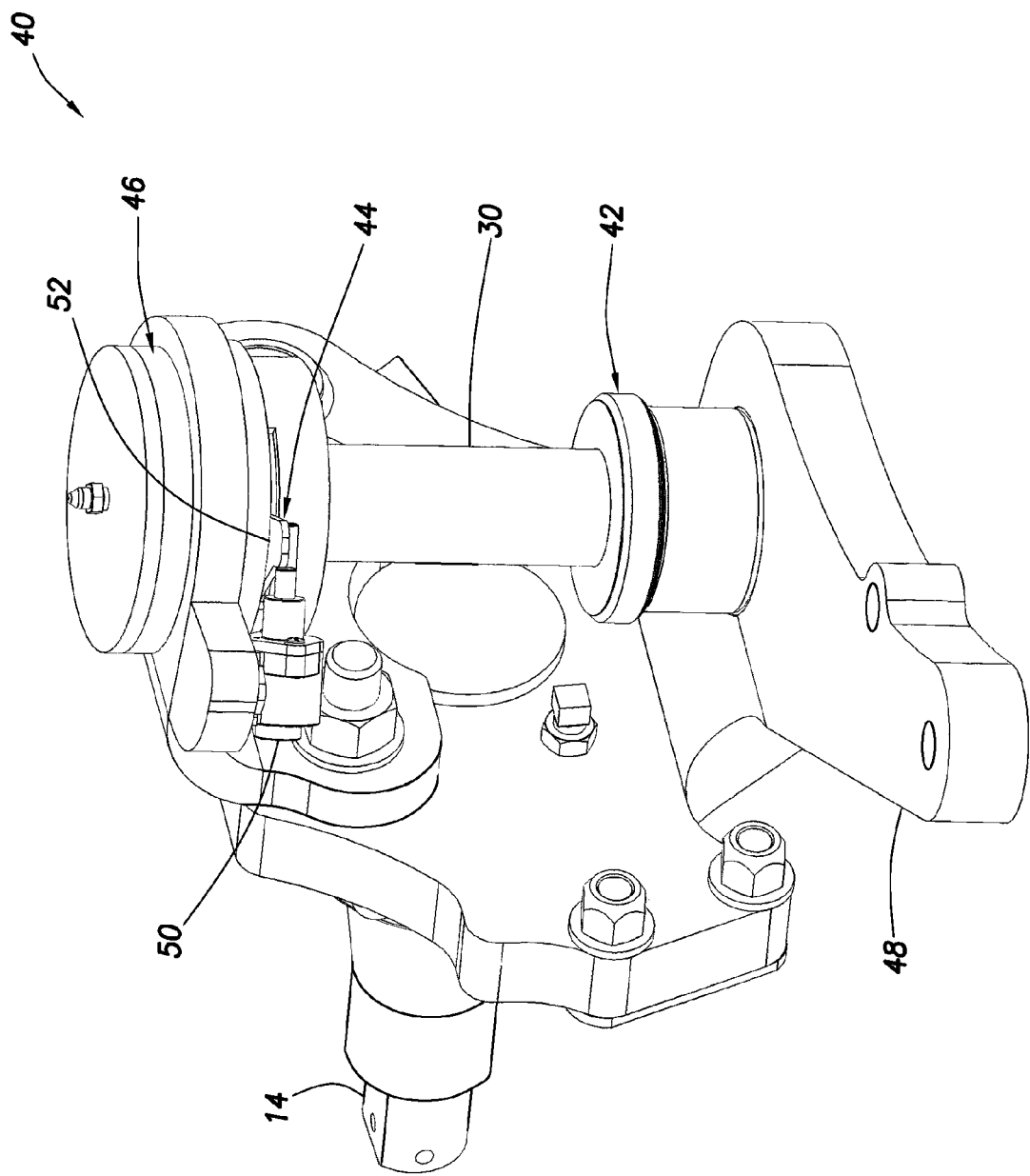
FIG. 3 is a representative side view of a king pin and a steering knuckle assembly which can embody principles of this disclosure.

Referring additionally now to FIG. 3, a steering knuckle assembly 40 which can embody principles of this disclosure is representatively illustrated. The steering knuckle assembly 40 may be used with the suspension system 12 of FIGS. 2 & 2A (in place of the steering knuckle assembly 22, actuators 26 and steer lock 34), or it may be used with other types of suspension systems.

One beneficial feature of the steering knuckle assembly 40 is that it includes a steer damper 42, a steer lock 44 and a steer return 46 integrated into the assembly. The assembly 40 is relatively low in weight, comprises relatively few components, and is convenient to manufacture and maintain.

Note that, with the king pin 30 installed, the steer damper 42 is positioned such that the king pin housing 32 on the axle 24 will be between the steer damper and each of the steer lock 44 and steer return 46. This provides a relatively compact configuration of the steer lock 44 and steer return 46 at one end of the king pin 30, and allows a weight of the vehicle 10 (transmitted via the axle 24 and king pin housings 32) to bear on the steer damper 42.

In the FIG. 3 example, the steering knuckle assembly 40 also includes a fabricated steering knuckle 48 with provisions for mounting brake components to the steering knuckle. However, use of such a steering knuckle is not necessary, in keeping with the scope of this disclosure.

The steer lock 44 includes an actuator 50 for rotating a cam 52 (described more fully below). The actuator 50 is preferably a pneumatic actuator, but other types of actuators (such as, hydraulic or electrical actuators) may be used, if desired.

Figure 4:
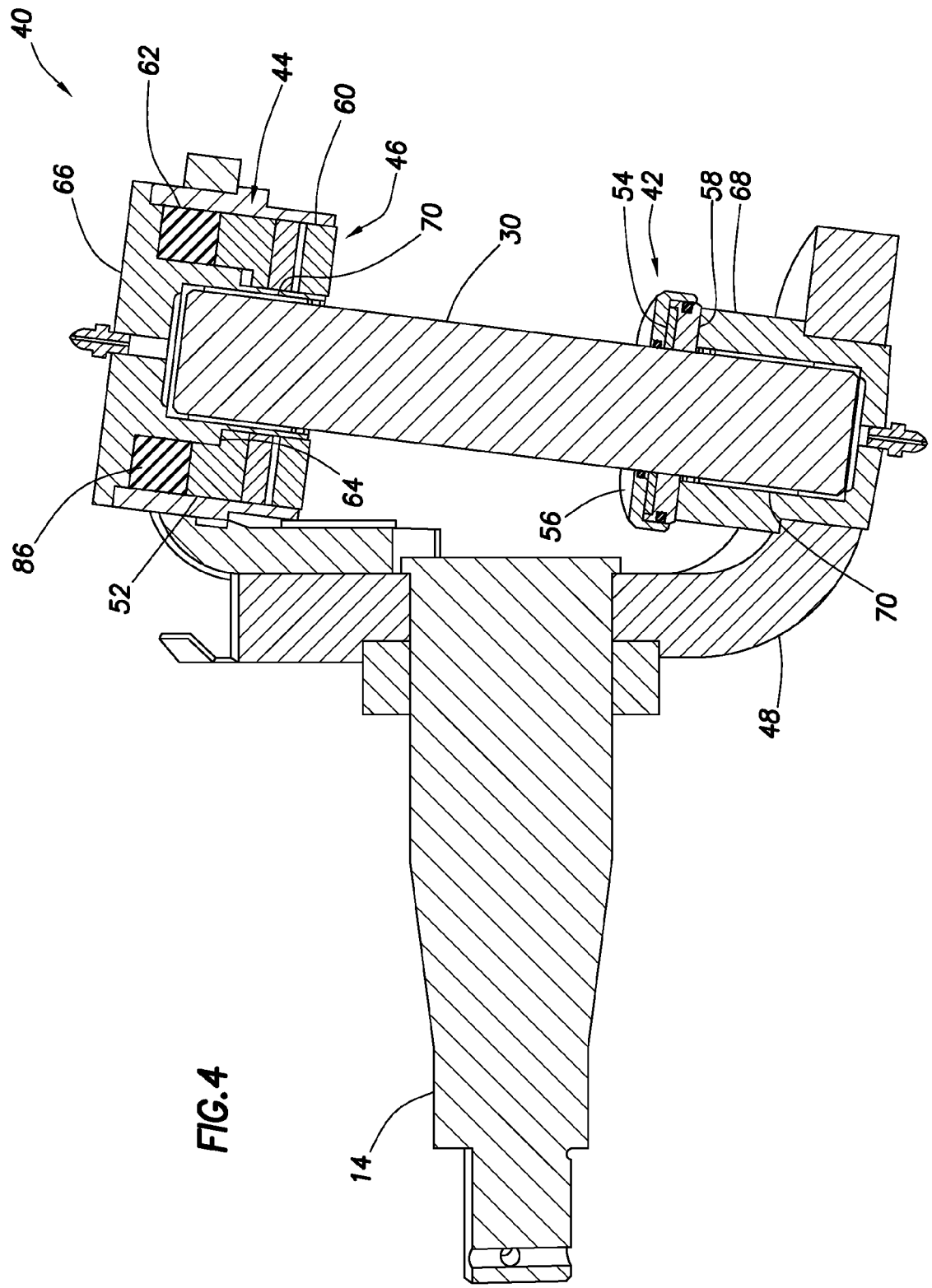
FIG. 4 is a representative cross-sectional view of the king pin and steering knuckle assembly.

Referring additionally now to FIG. 4, a cross-sectional view of the steering knuckle assembly 40 and king pin 30, taken laterally along a center of the spindle 14 is representatively illustrated. In this view, a manner in which the steer damper 42, steer lock 44 and steer return 46 extend about the king pin 30 can be clearly seen.

The steer damper 42 includes a friction material in the form of a thrust washer 54 interposed between a cover 56 and an end cap 58. As mentioned above, the weight of the vehicle 10 (or at least a portion thereof) is applied to the steer damper 42, so that the steer damper is compressed between the king pin housing 32 and a lower arm of the steering knuckle 48.

The steering knuckle assembly 40 rotates about the king pin 30 on sleeve bearings 70. The bearings 70 are retained in upper and lower king pin bearing housings 66, 68.

When the steering knuckle 48 rotates about the king pin 30, the cover 56 rotates relative to the end cap 58, and friction between the washer 54 and these components resists such rotation. This dampens rotation of the steering knuckle assembly 40.

Preferably, the washer 54 is made of a composite material, such as VESPEL™ SP-21 polymide, manufactured by E.I. du Pont de Nemours and Company. However, other materials and other types of steer dampers may be used, in keeping with the scope of this disclosure.

The steer return 46 includes an expandable steer return device 60 and a biasing device 62. The steer lock 44 includes the cam 52, which in this example is interposed between the steer return device 60 and the biasing device 62.

As described more fully below, when the cam 52 is rotated by the actuator 50 relative to a steer lock profile 64 formed on a king pin bearing housing 66, the cam prevents axial expansion of the steer return device 60, and prevents deformation of the biasing device 62. This prevents rotation of the steering knuckle assembly 40 relative to the king pin 30.

Figure 5:
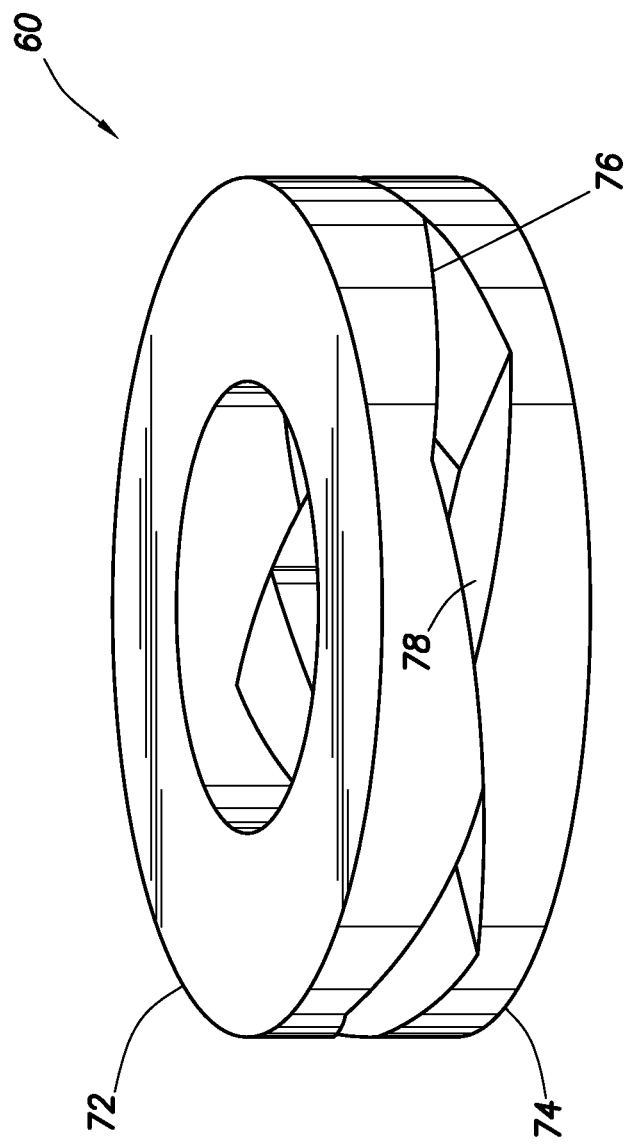
FIG. 5 is a representative perspective view of a steering return device which may be used in the steering knuckle assembly.

Referring additionally now to FIG. 5, the steer return device 60 is representatively illustrated, apart from the remainder of the steering knuckle assembly 40. In this view, it may be seen that the steer return device 60 includes two generally annular-shaped thrust bearings 72, 74 having respective circumferentially extending alternately upwardly and downwardly inclined faces 76, 78.

As depicted in FIG. 5, the upper bearing 72 has been rotated somewhat relative to the lower bearing 74, and sliding engagement between the inclined faces 76, 78 has resulted in some axial expansion of the device 60. It will be appreciated that, if the upper bearing 72 rotates with the steering knuckle 48, and the lower bearing 74 remains fixed relative to the king pin housing 32, then the device 60 can axially expand and contract in response to rotation of the steering knuckle relative to the king pin housing.

Preferably, the bearings 72, 74 are configured and positioned in the steering knuckle assembly 40, so that the device 60 has a minimum axial dimension when the steering knuckle assembly is centered. The axial dimension of the device 60 increases as the steering knuckle assembly 40 rotates in either direction away from center.

This axial expansion of the device 60 when the steering knuckle assembly 40 rotates away from center is used to deform the biasing device 62, so that a biasing force exerted by the biasing device increases due to the axial expansion of the device 60. It will be appreciated that, as an axial biasing force applied to the device 60 increases, the device will be urged toward its contracted dimension (due to the engagement between the inclined faces 76, 78), thereby also urging the steering knuckle assembly 40 toward its centered position. Thus, the steer return device 60, in cooperation with the biasing device 62, functions to return the steering knuckle assembly 40 to its centered position, whenever the steering knuckle assembly has been rotated away from its centered position.

Figure 6A:
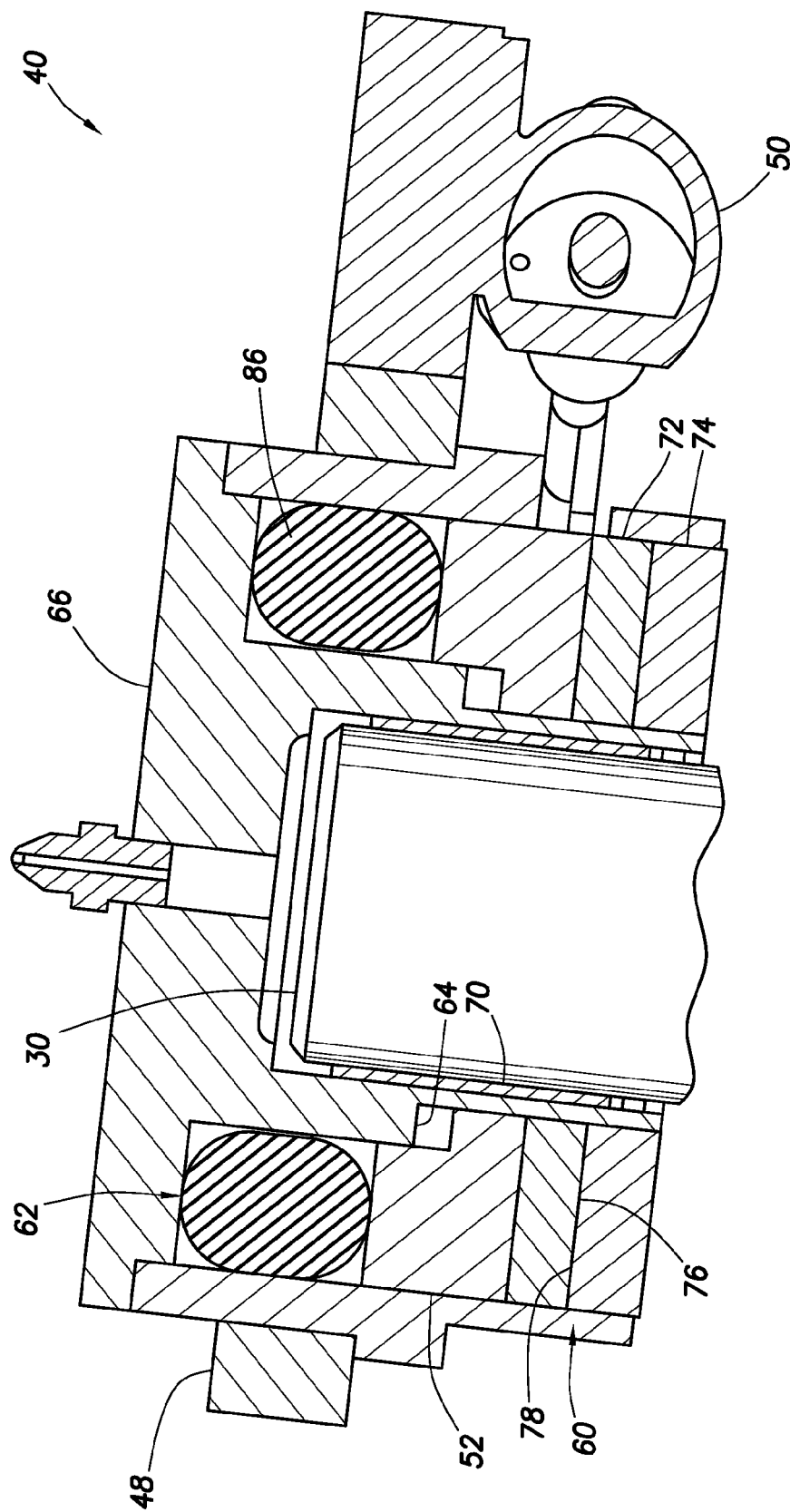
FIGS. 6A & B are representative cross-sectional views of an upper portion of the steering knuckle assembly in centered and steered configurations.

A manner in which this result can be accomplished is representatively illustrated in FIGS. 6A & B. In these views, only an upper portion of the steering knuckle assembly 40 and king pin 30 are depicted for clarity.

The biasing device 62 in FIGS. 6A & B comprises an elastomeric material 86 in the shape of an axially elongated toroid. However, other materials and other shapes may be used, if desired. For example, a coiled metal compression spring, leaf spring or wave spring, etc., could be used in some embodiments.

In FIG. 6A, the steering knuckle assembly 40 is depicted in a centered position. In this position, the steer return device 60 is axially contracted. The biasing device 62 is not axially compressed, or it may be only somewhat compressed, thereby supplying an initial "preloading" to the steer return device 60.

Figure 6B:
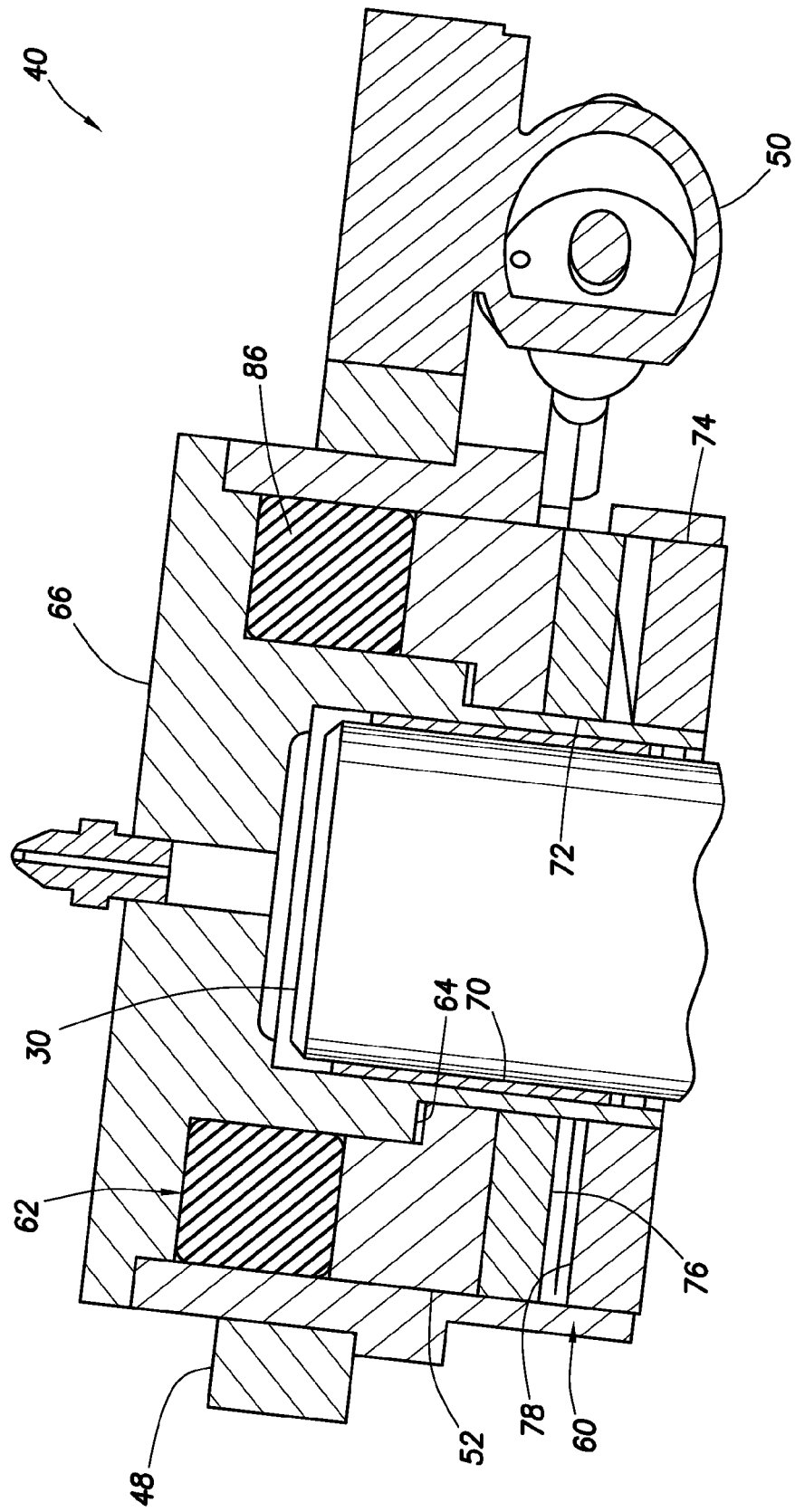

In FIG. 6B, the steering knuckle assembly 40 is depicted in a position in which it has been rotated away from the centered position of FIG. 6A. In this rotated position, the device 60 is axially expanded (due to rotation of the upper thrust bearing 72 relative to the lower thrust bearing 74, and the engagement between the inclined faces 76, 78).

Such axial expansion of the device 60 displaces the cam 52 axially upward, thereby compressing the biasing device 62. Axial compression of the biasing device 62 increases a biasing force exerted by the biasing device, resulting in a torque (due to the engagement between the inclined faces 76, 78), which urges the steering knuckle assembly 40 back toward its centered position.

Note that, although the device 60 expands axially when the steering knuckle assembly 40 is rotated away from its centered position, the steering knuckle assembly does not itself axially displace relative to the king pin 30 and axle 24. This is beneficial, in that a steering geometry of the suspension system 12 will not change due to such axial displacement of the steering knuckle assembly.

In this example, the cam 52 should be permitted to axially displace, in order to allow the device 60 to expand and contract, and to allow the biasing device 62 to be axially compressed and apply a biasing force to the device 60. If, however, the cam 52 is prevented from axially displacing when the steering knuckle assembly 40 is in its centered position, axial expansion of the steer return device 60 will not be permitted and, thus, rotation of the steering knuckle assembly will also not be permitted.

Figure 7:
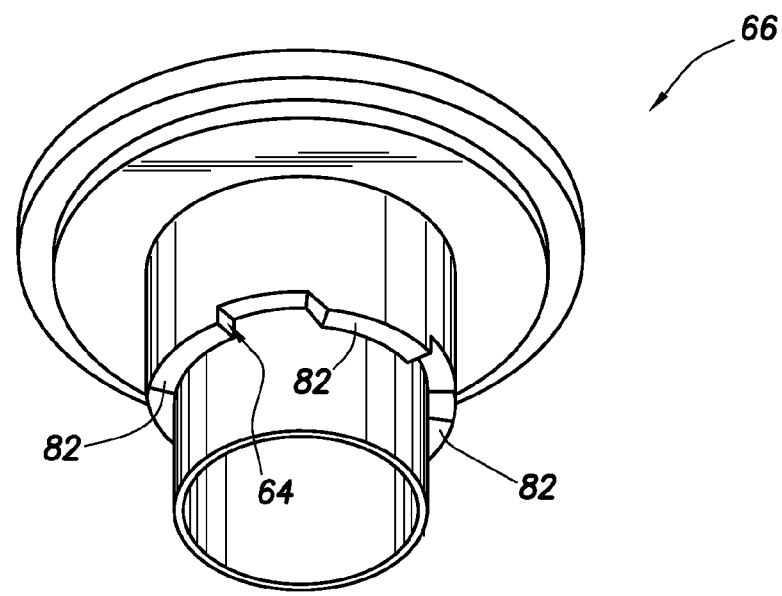
FIG. 7 is a representative perspective view of a steer lock profile on a king pin bearing housing of the steering knuckle assembly.
Figure 8:
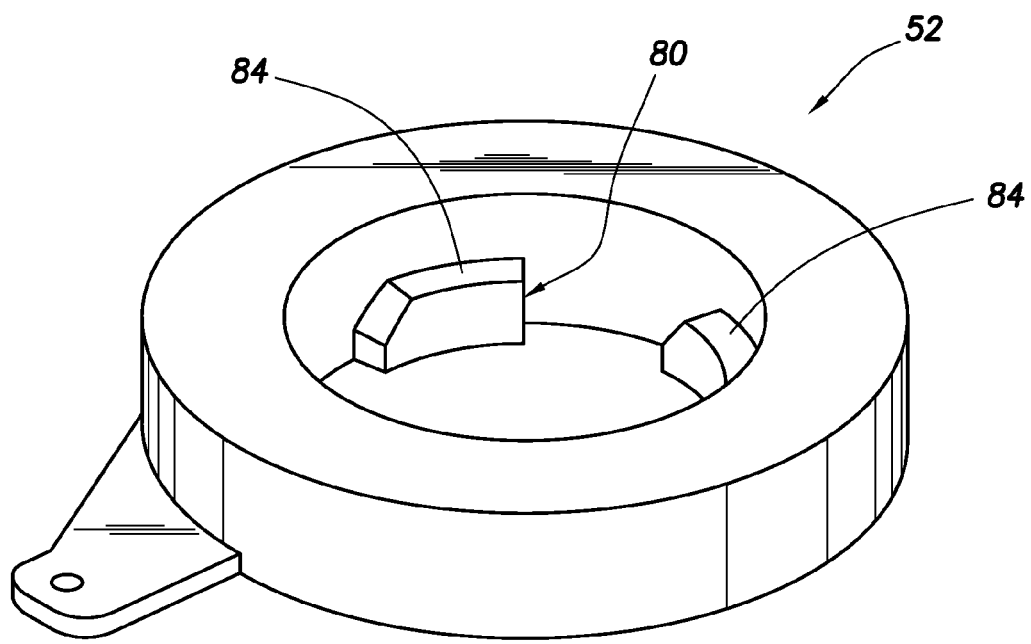
FIG. 8 is a representative perspective view of a steer lock cam of the steering knuckle assembly.

Referring additionally now to FIGS. 7 & 8, enlarged views of the bearing housing 66 and cam 52 are representatively illustrated. In these views, it may be seen that the profile 64 on the bearing housing 66 is complementarily shaped relative to another circumferentially extending profile 80 formed in the cam 52.

When the actuator 50 activates the steer lock 44 by rotating the cam 52 relative to the bearing housing 66, the profiles 64, 80 cooperate to prevent axial displacement of the cam relative to the bearing housing. For this purpose, the profile 64 includes lands 82 which are rotationally aligned with lands 84 of the profile 80 when the actuator 50 activates the steer lock 44. When the steer lock 44 is deactivated, the lands 82, 84 are not aligned, and the cam 52 is allowed to displace axially relative to the bearing housing 66.

Figure 9:
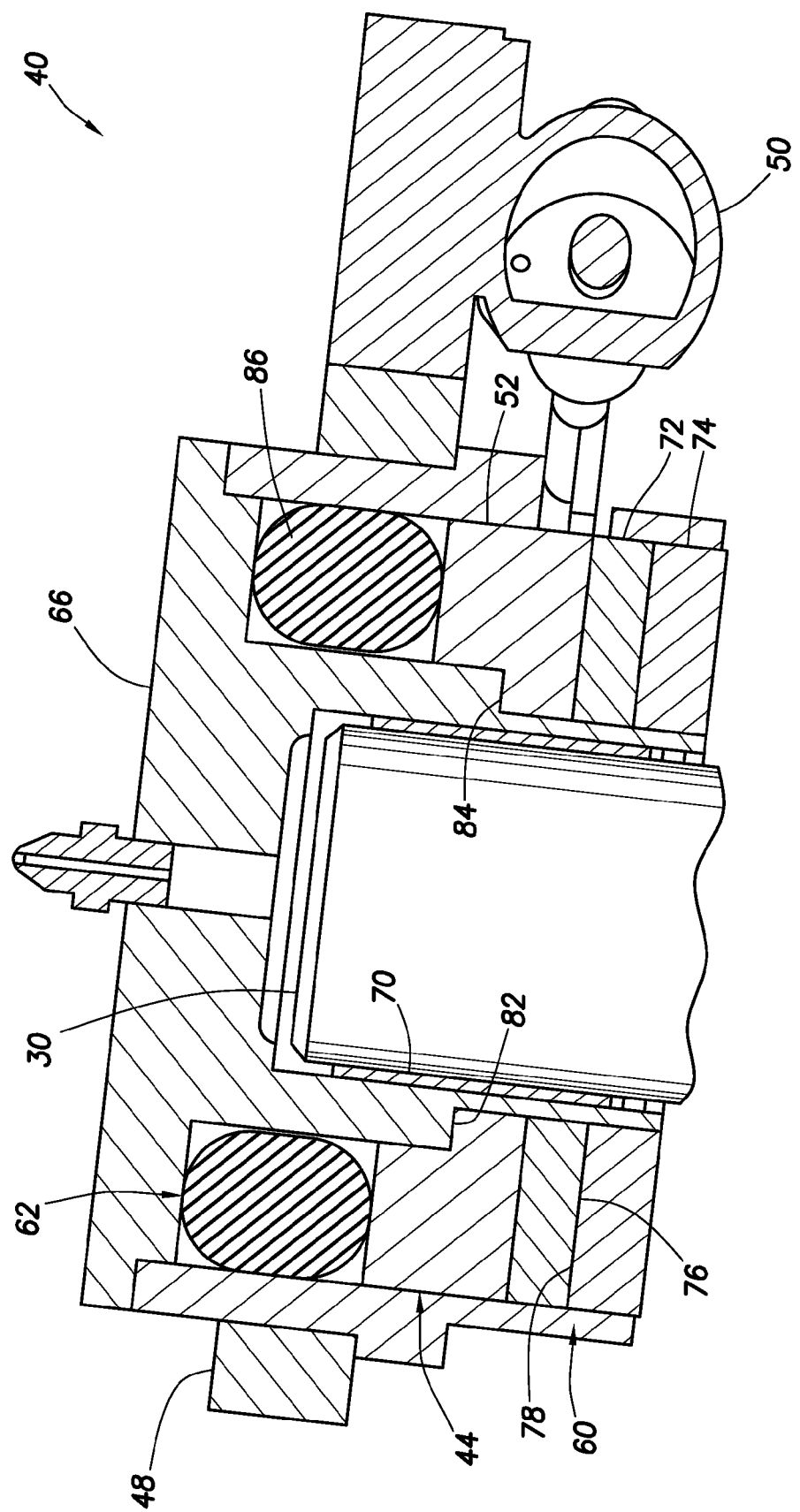
FIG. 9 is a representative cross-sectional view of the upper portion of the steering knuckle assembly, with the steer lock activated.

Referring additionally now to FIG. 9, the steering knuckle assembly 40 is representatively illustrated after the steer lock 44 has been activated, with the steering knuckle assembly in its centered position. Note that the steer return device 60 is in its axially contracted configuration, and is prevented from axially expanding due to the rotational alignment of the lands 82, 84 on the respective bearing housing 66 and cam 52.

Referring additionally now to FIGS. 10A & B, another example of the steering knuckle assembly 40 is representatively illustrated in respective centered and rotated positions. In this example, the steer lock 44 is not included, but the steer lock could be provided if desired.

Note that, in the FIGS. 10A & B example, the biasing device 62 is not radially separated from the king pin 30 by the bearing housing 66, and the biasing device is positioned axially below the king pin bearing 70. This demonstrates that a wide variety of different configurations are possible, within the scope of this disclosure.

Figure 11A:
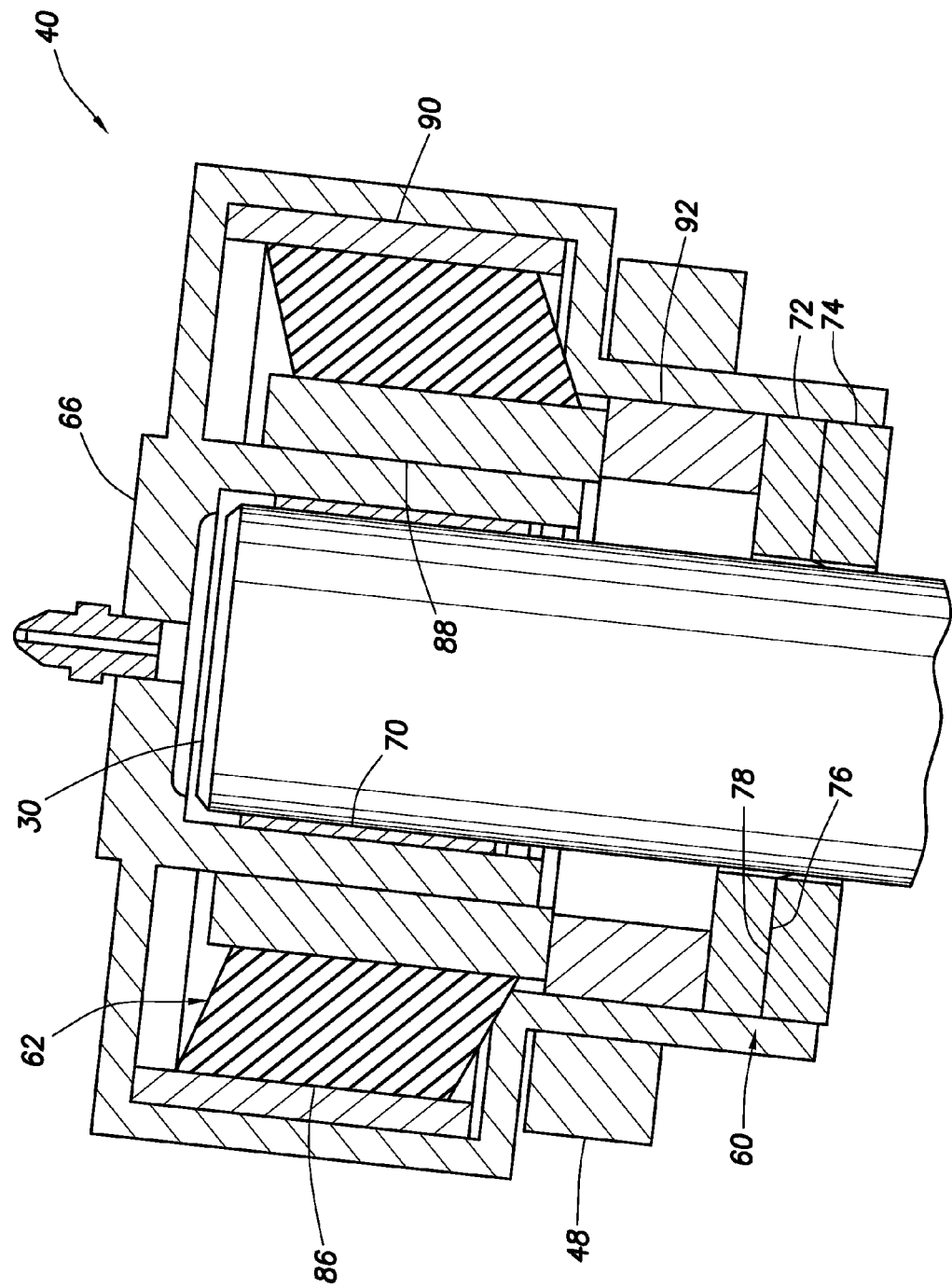
Figure 11B:
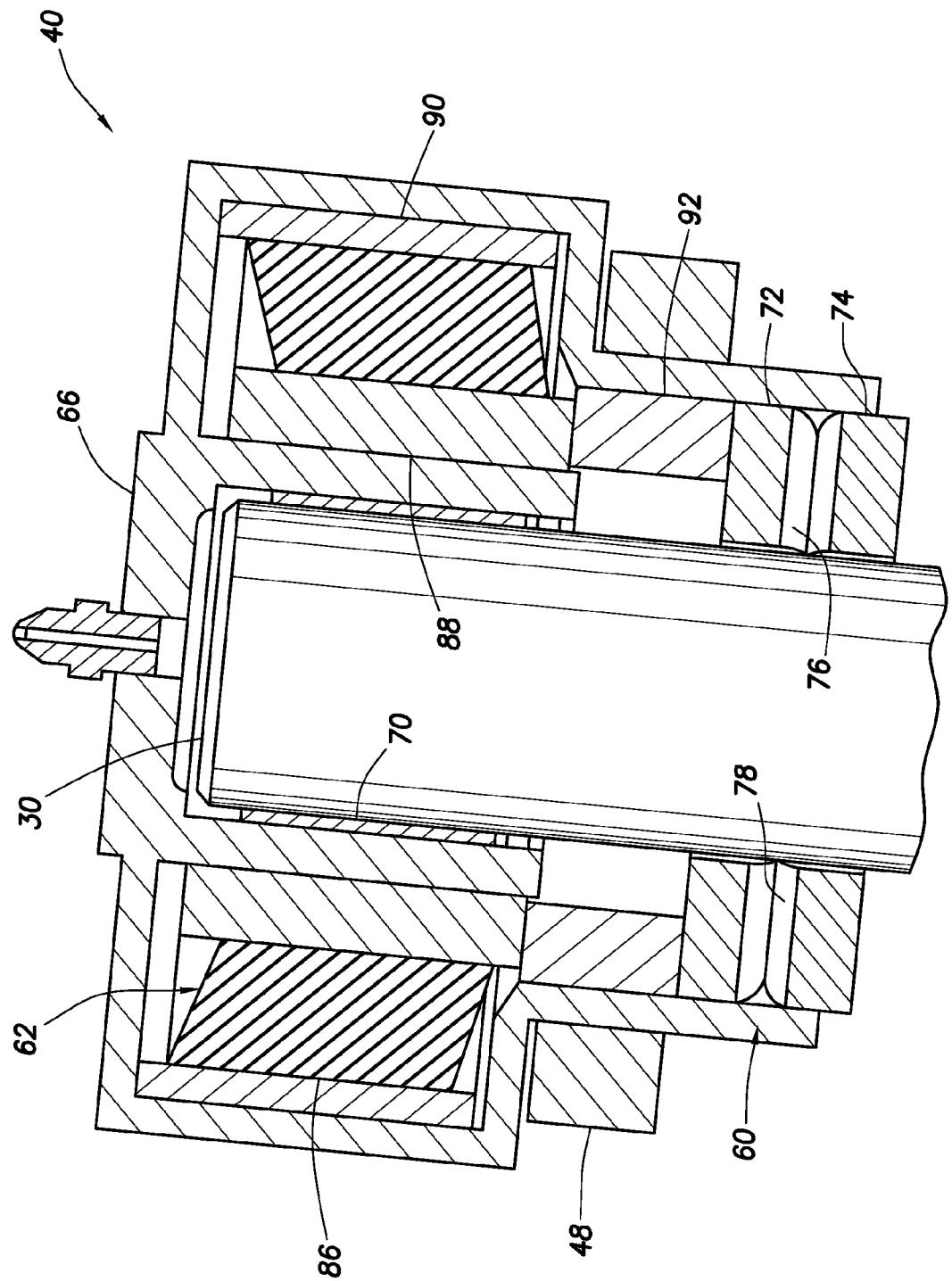

Yet another example is representatively illustrated in FIGS. 11A & B, in respective centered and rotated positions. The biasing device 62 in this example includes an annular elastomeric material 86 bonded between inner and outer sleeves 88, 90.

An annular member 92 may be used to transmit the biasing force and axial deflection between the biasing device 62 and the steer return device 60. In other examples, the member 92 could be integrally formed with the inner sleeve 88.

Note that, in the FIGS. 11A & B example, the biasing device 62 exerts an increased biasing force due to increased shear stress in the biasing device when the steering knuckle assembly 40 is rotated away from center, whereas in the previously described examples the biasing device exerts increased biasing force due to increased compressive stress therein. This demonstrates that the scope of this disclosure is not limited to any particular way of increasing the biasing force exerted by the biasing device 62.

Figure 12A:
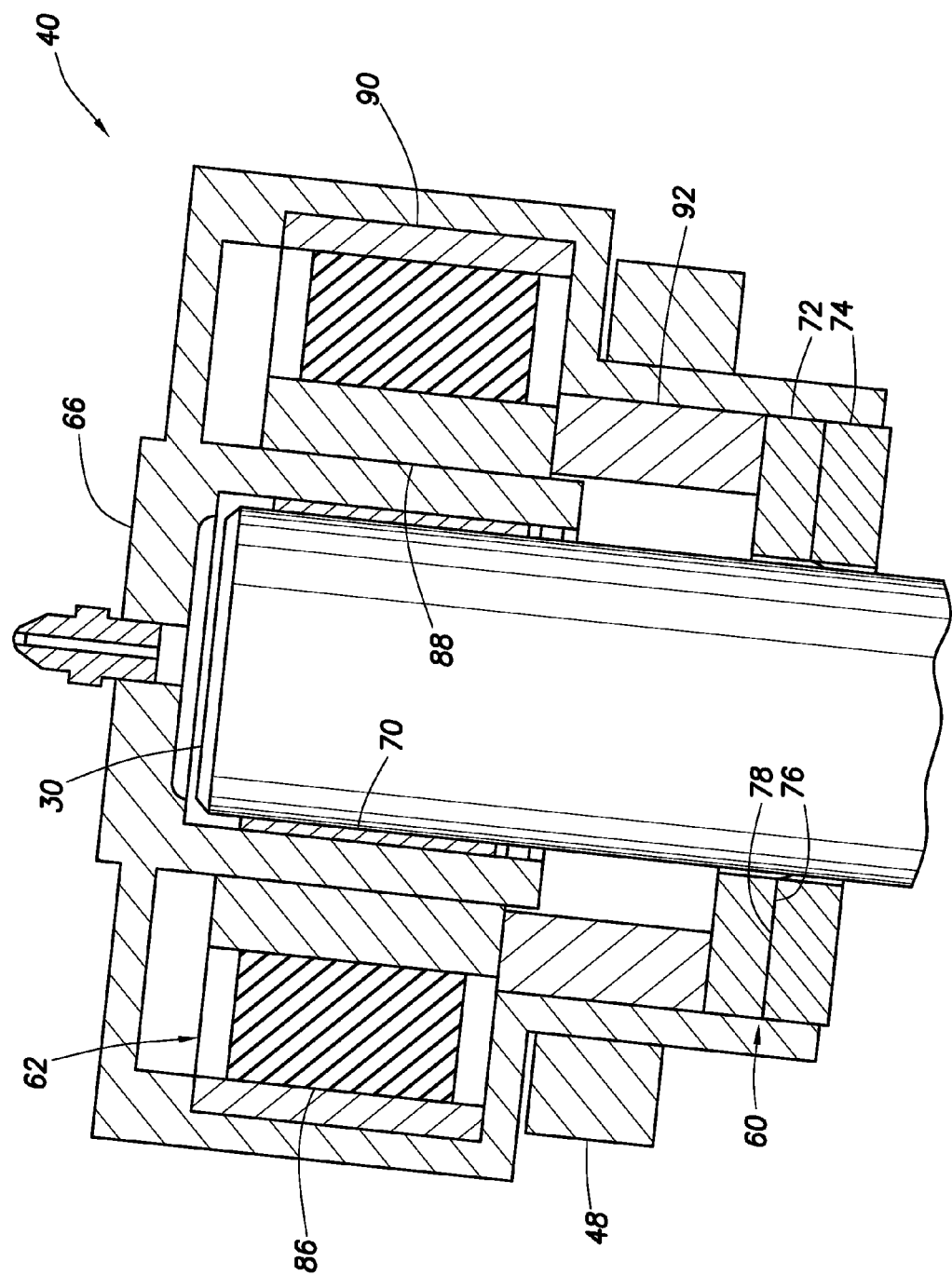
Figure 12B:
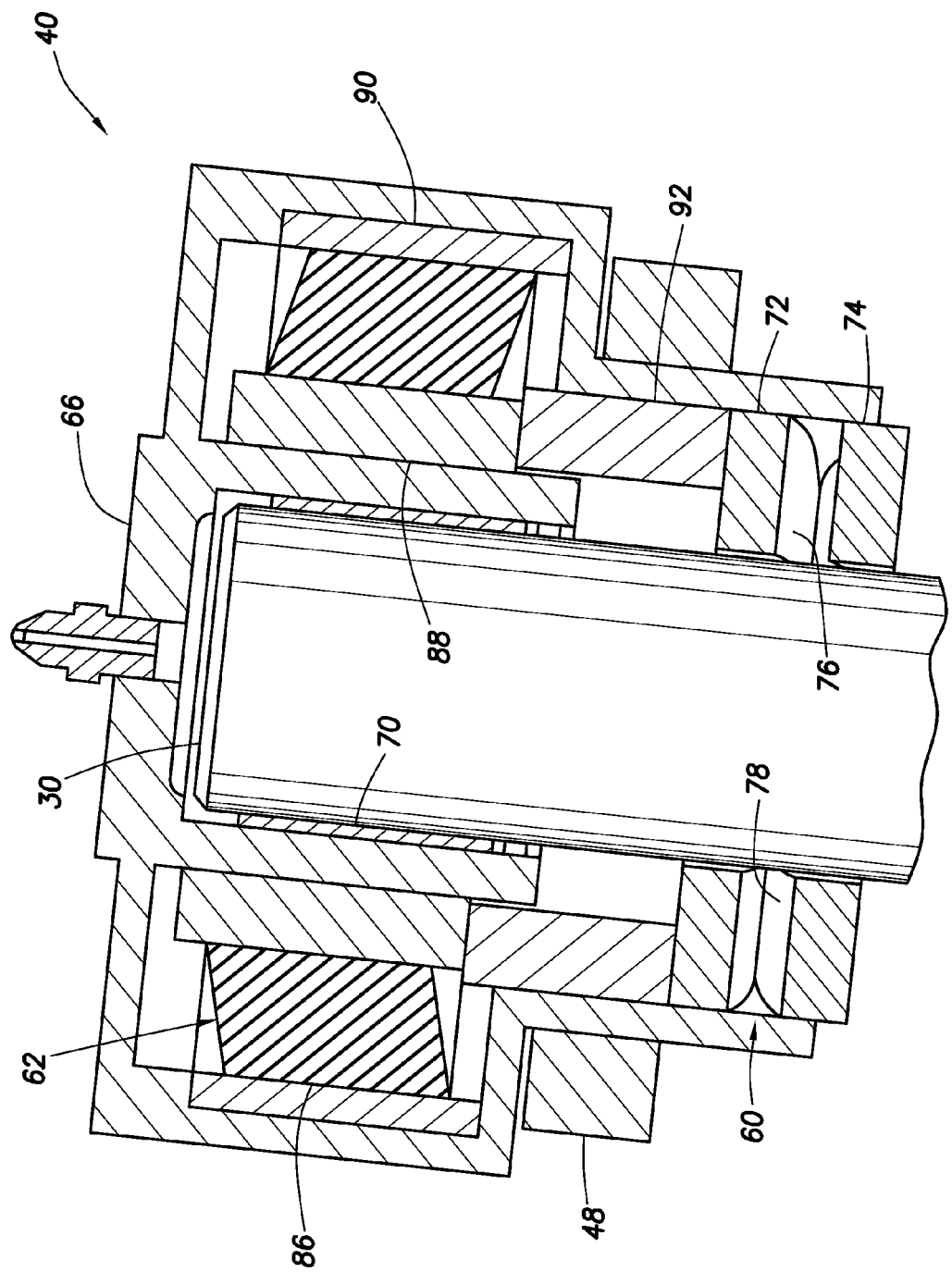

Referring additionally now to FIGS. 12A & B, a further example of the steering knuckle assembly 40 is representatively illustrated in respective centered and rotated positions. The FIGS. 12A & B example is similar in most respects to the FIGS. 11A & B example, but differs mainly in the shape of the elastomeric material 86.

Specifically, in the FIGS. 11A & B example, the elastomeric material 86 is deformed toward a right cylindrical shape when the steering knuckle assembly 40 is rotated away from the centered position, whereas in the FIGS. 12A & B example the elastomeric material is deformed away from a right cylindrical shape. This demonstrates that the scope of this disclosure is not limited to any particular manner of deforming the biasing device 62.

It may now be fully appreciated that the above disclosure provides significant advances to the art of constructing vehicle suspension systems. In a variety of examples described above, the suspension system 12 can be provided with an improved steering knuckle assembly 40 which incorporates therein the steer damper 42, steer lock 44 and the steer return 46, thereby reducing weight, manufacturing costs, inventory and maintenance requirements for the suspension system.

An improved vehicle suspension system 12 is described above. In one example, the suspension system 12 can include a steering knuckle assembly 40 including a steer return device 60 and a biasing device 62 which is deformed by the steer return device 60. The biasing device 62 can comprise an elastomeric toroid.

The biasing device 62 and the steer return device 60 may be positioned at a same end of a king pin 30. The steer lock 44 can also be positioned at the same end of the king pin 30.

Activation of the steer lock 44 may prevent deformation of the biasing device 62 by the steer return device 60. Activation of the steer lock 44 may prevent expansion of the steer return device 60. The steer lock 44 can include a cam 52 which rotates about the king pin 30.

The steering knuckle assembly 40 may also include a steer damper 42 which dampens rotation of the steering knuckle assembly 40 about a king pin 30. The steer damper 42 may encircle the king pin 30. The steer damper 42 can be positioned opposite an axle king pin housing 32 from the steer return device 60 and the biasing device 62.

The steering knuckle assembly 40 can be rotated relative to a king pin 30, without axial displacement relative to the king pin 30, by a biasing force which results from deformation of the biasing device 62 by the steer return device 60.

Also described above is a vehicle suspension system 12 which can include a king pin 30 having opposite ends, and a steering knuckle assembly 40 including a steer return device 60, a steer lock 44, and a biasing device 62 which is deformed by the steer return device 60. The steer return device 60, steer lock 44 and biasing device 62 can be positioned at a same opposite end of the king pin 30.

The steer return device 60 may expand axially relative to the king pin 30 in response to rotation of the steering knuckle assembly 40 relative to the king pin 30 away from a centered position.

A vehicle suspension system 12 is also described above, which suspension system comprises a king pin 30, and a steering knuckle assembly 40 including a steer return device 60 which encircles the king pin 30. The steering knuckle assembly 40 can be rotated relative to the king pin 30, without axial displacement relative to the king pin 30, by a biasing force which results from deformation of a biasing device 62 by the steer return device 60.

A vehicle suspension system 12 described above can include a king pin 30, and a steering knuckle assembly 22 including a steer lock 34 which selectively permits and prevents rotation of the steering knuckle assembly 22 relative to the king pin 30. The steer lock 34 can include a cam 52 which extends about an axis of the king pin 30.

In some examples, the cam 52 can encircle the king pin 30. However, in other examples, the cam 52 could be otherwise located, such as, in the bearing housing 66 above the king pin 30, etc.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A vehicle suspension system, comprising:
a steering knuckle assembly including a steer return device, a biasing device which is deformed by the steer return device and a steer lock which encircles a king pin.

2. The suspension system of claim 1, wherein the biasing device and the steer return device are positioned at a same end of the king pin.

3. The suspension system of claim 2, wherein the steer lock is positioned at the same end of the king pin.

4. The suspension system of claim 3, wherein activation of the steer lock prevents deformation of the biasing device by the steer return device.

5. The suspension system of claim 3, wherein activation of the steer lock prevents expansion of the steer return device.

6. The suspension system of claim 1, wherein the steering knuckle assembly further comprises a steer damper which dampens rotation of the steering knuckle assembly about the king pin.

7. The suspension system of claim 6, wherein the steer damper encircles the king pin.

8. The suspension system of claim 7, wherein the steer damper is positioned opposite an axle king pin housing from the steer return device and the biasing device.

9. A vehicle suspension system, comprising:
a steering knuckle assembly including:
a steer return device,
a biasing device which is deformed by the steer return device, the biasing device comprising an elastomeric toroid, and
a steer lock positioned at the same end of the king pin, wherein the steer lock comprises a cam which rotates about the king pin.

10. A vehicle suspension system, comprising:
a steering knuckle assembly including:
a steer return device, and
a biasing device which is deformed by the steer return device, the biasing device comprising an elastomeric toroid,
wherein the steering knuckle assembly is rotated relative to a king pin, without axial displacement relative to the king pin, by a biasing force which results from deformation of the biasing device by the steer return device.

11. A vehicle suspension system, comprising:
a king pin having opposite ends; and
a steering knuckle assembly including a steer return device, a steer lock, and a biasing device which is deformed by the steer return device,
wherein the steer return device, steer lock and biasing device are positioned at a same opposite end of the king pin.

12. The suspension system of claim 11, wherein the biasing device comprises an elastomeric toroid.

13. The suspension system of claim 11, wherein activation of the steer lock prevents deformation of the biasing device by the steer return device.

14. The suspension system of claim 11, wherein activation of the steer lock prevents expansion of the steer return device.

15. The suspension system of claim 11, wherein the steer lock comprises a cam which rotates about the king pin.

16. The suspension system of claim 11, further comprising a steer damper which dampens rotation of the steering knuckle assembly about the king pin.

17. The suspension system of claim 16, wherein the steer damper encircles the king pin.

18. The suspension system of claim 16, wherein the steer damper is positioned opposite an axle king pin housing from the steer return device, the steer lock and the biasing device.

19. The suspension system of claim 11, wherein the steering knuckle assembly is rotated relative to the king pin, without axial displacement relative to the king pin, by a biasing force which results from deformation of the biasing device by the steer return device.

20. The suspension system of claim 11, wherein the steer return device expands axially relative to the king pin in response to rotation of the steering knuckle assembly relative to the king pin away from a centered position.

21. A vehicle suspension system, comprising:
a king pin; and
a steering knuckle assembly including a steer return device which comprises at least one annular-shaped thrust bearing,
wherein the steering knuckle assembly is rotated relative to the king pin, without axial displacement relative to the king pin, by a biasing force which results from deformation of a biasing device by the steer return device.

22. The suspension system of claim 21, wherein the biasing device comprises an elastomeric toroid.

23. The suspension system of claim 21, wherein the biasing device and the steer return device are positioned at a same end of the king pin.

24. The suspension system of claim 21, further comprising a steer lock, and wherein the steer lock, biasing device and steer return device are positioned at a same end of the king pin.

25. The suspension system of claim 24, wherein activation of the steer lock prevents deformation of the biasing device by the steer return device.

26. The suspension system of claim 24, wherein activation of the steer lock prevents expansion of the steer return device.

27. The suspension system of claim 24, wherein the steer lock comprises a cam which rotates about the king pin.

28. The suspension system of claim 21, further comprising a steer damper which dampens rotation of the steering knuckle assembly about the king pin.

29. The suspension system of claim 28, wherein the steer damper encircles the king pin.

30. The suspension system of claim 28, wherein the steer damper is positioned opposite an axle king pin housing from the steer return device and the biasing device.

31. A vehicle suspension system, comprising:
a king pin; and
a steering knuckle assembly including a steer lock which selectively permits and prevents rotation of the steering knuckle assembly relative to the king pin, and
wherein the steer lock includes a cam which extends about an axis of the king pin.

32. The suspension system of claim 31, wherein the cam encircles the king pin.

33. The suspension system of claim 31, wherein activation of the steer lock prevents deformation of a biasing device.

34. The suspension system of claim 33, wherein the biasing device comprises an elastomeric toroid.

35. The suspension system of claim 33, wherein activation of the steer lock prevents deformation of the biasing device by a steer return device.

36. The suspension system of claim 31, wherein activation of the steer lock prevents expansion of a steer return device.

37. The suspension system of claim 36, wherein the steer return device encircles the king pin.

38. The suspension system of claim 31, wherein the steer lock, a biasing device and a steer return device are positioned at a same end of the king pin.

39. The suspension system of claim 38, wherein activation of the steer lock prevents expansion of the steer return device and deformation of the biasing device.

40. The suspension system of claim 31, further comprising a steer damper which dampens rotation of the steering knuckle assembly about the king pin.

41. The suspension system of claim 40, wherein the steer damper encircles the king pin.

42. The suspension system of claim 40, wherein the steer damper is positioned opposite an axle king pin housing from the steer lock.

* * * * *